R. O. PAINE.
OIL CUP.
APPLICATION FILED NOV. 10, 1916.
1,232,383.
Patented July 3, 1917.
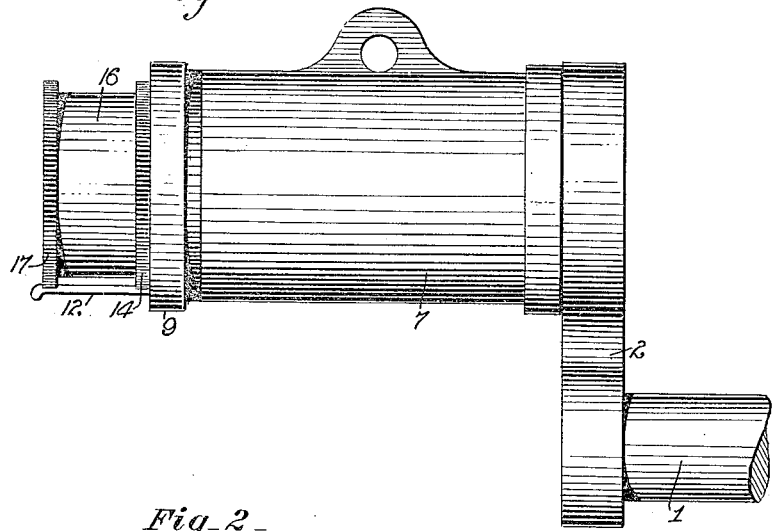
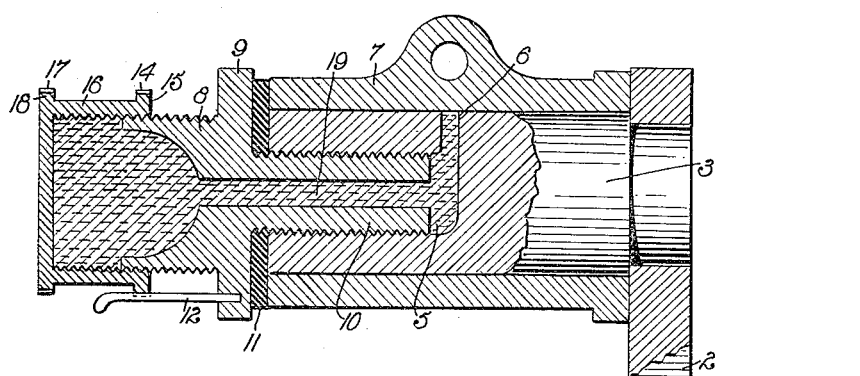
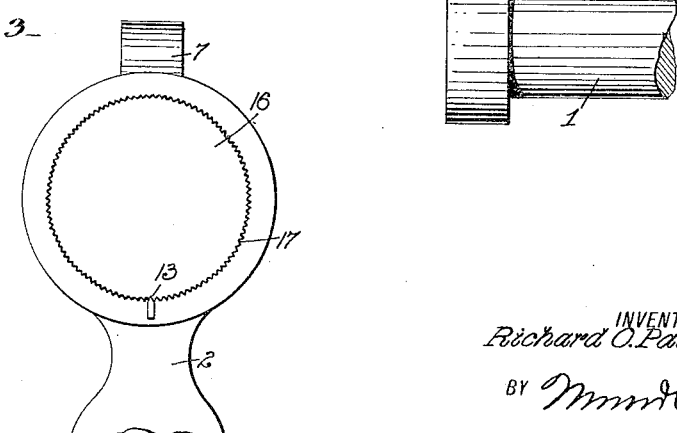
WITNESSES
Frank C. Palmer,
A. L. Kitchin.
INVENTOR
Richard O. Paine
BY
ATTORNEYS

UNITED STATES PATENT OFFICE.

RICHARD O. PAINE, OF ANSLEY, NEBRASKA.

OIL-CUP.

1,232,383.  Specification of Letters Patent.  Patented July 3, 1917.

Application filed November 10, 1916. Serial No. 130,564.

*To all whom it may concern:*

Be it known that I, RICHARD O. PAINE, a citizen of the United States, and a resident of Ansley, in the county of Custer and State of Nebraska, have invented a new and Improved Oil-Cup, of which the following is a full, clear, and exact description.

This invention relates to oil cups and particularly to oil cups for mowing machines, sickles and the like, and has for an object the provision of an improved construction whereby the cap is locked in any adjusted position.

Another object in view is to provide a cup in combination with the wrist pin of a crank member whereby oil may be forced through part of the wrist pin longitudinally and then laterally to the surface.

In the accompanying drawing:

Figure 1 is a side view of a crank and associated parts together with a cup disclosing an embodiment of the invention.

Fig. 2 is a longitudinal vertical section through the structure shown in Fig. 1.

Fig. 3 is an end view of the structure shown in Fig. 1.

Referring to the accompanying drawing by numerals, 1 indicates a rod to which the crank 2 is secured, crank 2 carrying a wrist pin 3. The wrist pin 3 is provided with a shoulder 4, a large threaded passageway 5 extending longitudinally of the wrist pin from the outer end toward the crank 2. The large passageway 5 merges into a transverse or radially extending passageway 6 whereby a lubricant may be forced to the periphery of the wrist pin 3 and lubricate said periphery and the interior of the boxing 7. The crank 2 and associated parts, including the wrist pin and the boxing, may be part of any kind of a machine but is particularly used in connection with a mowing machine, the box 7 being connected with the sickle thereof. Being connected with the sickle of a mowing machine causes the parts to be more or less shaken up continually, though the pin 3 remains in a substantially horizontal position.

The cup 8 is provided with a flange 9 and a hollow exteriorly threaded extension 10 which is screwed into the passageway or bore 5. A packing washer 11 may be utilized between the cup 8 and flange 9, said washer being of any suitable material, as for instance, rubber. The flange 9 of the cup carries a resilient arm 12 adapted to have an edge 13 for fitting into the notches 14 in flange 15 of cap 16 and also into the notches 17 of flange 18 of cap 16. When the cup 8 is substantially full, as shown in Fig. 2, the spring locking member 12 will only engage the flange 15 but when the cup 8 is empty or substantially empty the spring locking member 12 engages both the inner and outer flanges 15 and 18 so as to positively prevent an accidental rotation thereof. By this construction and arrangement the cap is positively prevented from rotating accidentally regardless of the position thereof on the cup 8. This is especially desirable in mowing machines and other machines where the pin 3 is horizontal and where it is shaken to a great extent. It is understood, of course, that the cap 16 is threaded on to cup 8 and may be adjusted manually at any time so as to force the lubricant through the passageway 19 in the extension 10 and from thence eventually out of the passageway 6.

What I claim is:

An oil cup comprising a body having a hollow threaded extension and a flange acting as an abutment, a cap threaded on to said body, said cap having a pair of spaced radiating flanges, each of said flanges having notches therein, and a spring locking member mounted on the flange of said body engaging said notched flanges for preventing accidental rotation of the cap.

RICHARD O. PAINE.

Copies of this patent may be obtained for five cents each, by addressing the "Commissioner of Patents, Washington, D. C."